Feb. 14, 1956 L. R. DIXON ET AL 2,734,277
GAUGES
Filed Feb. 9, 1953
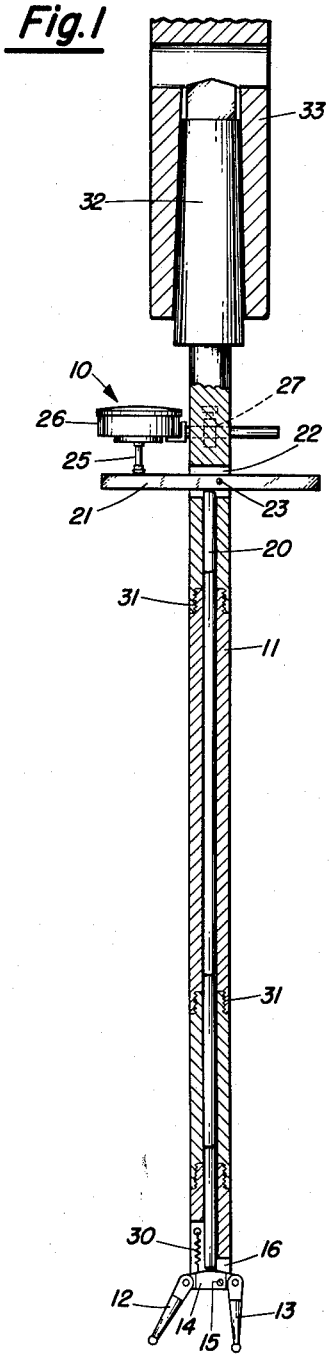
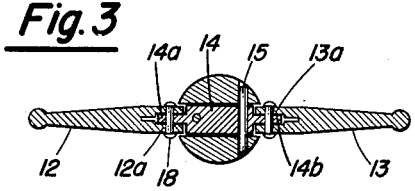
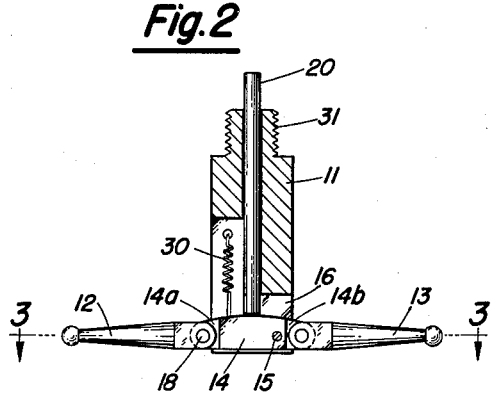
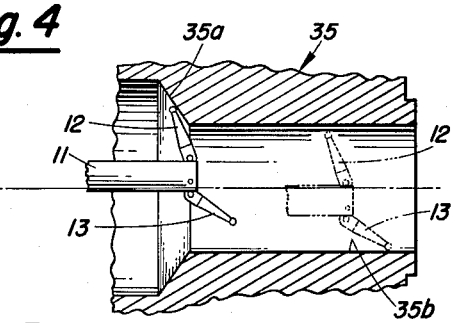
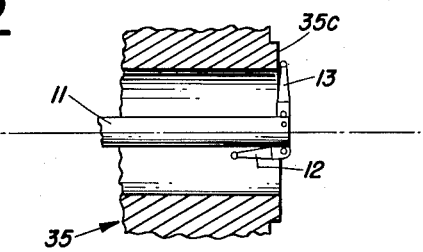
INVENTOR.
Patrick H. Conklin
Lowell R. Dixon
BY
Paul M. Klein Jr.
Attorneys

United States Patent Office 2,734,277
Patented Feb. 14, 1956

2,734,277

GAUGES

Lowell R. Dixon and Patrick H. Conklin,
Bremerton, Wash.

Application February 9, 1953, Serial No. 336,024

3 Claims. (Cl. 33—172)

(Granted under Title 35, U. S. Code (1952), sec. 266)

The invention described herein may be manufactured and used by and for the Government of the United States of America for Governmental purposes without the payment of any royalties thereon or therefor.

The present invention relates to gauges for indicating eccentricity of a cylindrical bore and analogous imperfections or inaccuracies in surfaces formed by the operation of drills and other rotary machines.

Certain surfaces, such as that at the innermost end of the narrow, elongated bore of a small reciprocating pump, are quite inaccessible so that considerable difficulty has been encountered in checking the accuracy of these surfaces. As an example, a common method of checking the mentioned bore of a small reciprocating pump entails the actual insertion of a very small gauge on the end of a rod into the bore and then the use of a flashlight and mirror to enable the operator to peer into the bore and note the position of the pointer on the dial or scale of the gauge. Obviously, since the gauge is small, its pointer is limited in its travel or movement and the perception of a small increment of travel of the pointer is practically impossible by the described method.

Accordingly, it is an object of the present invention to provide a gauge for checking surfaces at inaccessible points with great facility so as to indicate more precisely any inaccuracies or imperfections in those surfaces.

Other objects and many of the attendant advantages of this invention will be readily appreciated as the same becomes better understood by reference to the following detailed description when considered in connection with the accompanying drawings wherein:

Fig. 1 is an elevation of a gauge arranged in accordance with the present invention, with portions thereof shown in central vertical section to more clearly illustrate details of the construction;

Fig. 2 is an enlarged view of the lower portion of the device as shown in Fig. 1;

Fig. 3 is a section taken along lines 3—3 of Fig. 2;

Fig. 4 is a central section of a valve housing with the gauge illustrated in operative positions against two different machined surfaces;

Fig. 5 illustrates the gauge arranged for indicating the accuracy of the machining of yet another surface of the valve housing, shown in Fig. 4.

Essentially, the gauge of the present invention includes a visual indicator 10 mounted at one end of a thin, elongated bar 11 and arranged for actuation by surface contact members 12 and 13 positioned at the opposite end of this bar 11, so that when these surface contact members are within a bore in operative surface-engaging position, the indicator 10 remains without the bore so as to be directly visible to the machinist or other operator of the device.

In the preferred embodiment of the invention as shown in the drawings, the surface-contact members 12, 13 are in the form of tapering fingers, which are mounted at the opposite ends of a small block 14, fulcrumed on a pin 15 which extends transversely between opposite walls of a slot 16 formed adjacent the end of the thin elongated bar 11. The ends of the fingers adjacent the mounting block 14 are bifurcated as shown at 12a and 13a so as to straddle integral projections 14a and 14b on opposite ends of the block and are secured thereto for pivotal adjustment by means of rivets 18. The rivets, when applied, provide frictional engagement between the interior surfaces of the bifurcated portions 12a and 13a of the fingers and the juxtaposed surfaces of the projections 14a, 14b of a degree which precludes pivotal movement of the fingers relative to the block about the axis of the rivets in the absence of a predetermined amount of torque exerted against the fingers 12, 13. Unless the torque exerted on the fingers relative to the block exceeds this predetermined amount, the mounting block 14 merely will pivot on the described fulcrum pin 15 and thus the fingers may be considered, under such condition, as an integral and rigid part of the mounting block 14.

To facilitate point engagement with a surface to be indicated, the outer end of each tapered finger is shaped as a ball. When one ball is pressed against a surface, the finger and mounting block are caused to pivot about the fulcrum pin and transmit this motion to the pointer of the visual indicator 10. For this purpose, the fulcrum pin 15 is positioned laterally of the axis of the elongated bar 11 and a rod 20 is disposed slidably within an axial bore formed in the bar so as to abut the top of the finger mounting block 14 at a point substantially midway between the fingers 12, 13 and to one side of the described fulcrum pin 15. Therefore, pivotal movement of the block 14 will result in axial sliding movement of the rod 20 within the hollow bar 11. At its other end this rod 20 is in engagement with a lever 21 mounted pivotally within another slot 22 on a second pin 23 also displaced laterally of the axis of the hollow bar 11, so that any movement of the rod 20 within the bar will cause this lever 21 to rotate about this second pin 23. An outer portion of the lever 21 is in direct contact with the extremity of the plunger 25 of the mentioned indicator 10, which in the present instance is a dial type indicator. The indicator housing 26 is adjustably supported on the bar 11 as indicated at 27 so that the plunger 25 can be made to contact the lever 21 at a desired point. It is apparent that any such adjustment will vary the amount of movement of the pointer (not shown) of the indicator in response to a given angular or rotary displacement of the lever 21.

When arranged as described the plunger will normally extend from the housing 26 to its limit (i. e. pointer at zero on the indicator dial) so as to urge the lever 21 to a certain rotary position on its fulcrum pin 23, and therefore position the rod 20 similarly in a determined position within the hollow bar 11. To preclude further movement and actual emergence of the rod 20 from within the bar at its lower end under the influence of gravity, the finger mounting block 14 is held against the end of the rod by means of a spring 30 secured under tension between the bar 11 and the mounting block 14 at a point diametrically opposite the mounting-block fulcrum pin 15. This spring 30 is not of sufficient strength to overcome the resistance of the plunger 25 to movement from its extended position but does reduce the amount of torque required to rotate the mounting block 14 about the fulcrum pin 15 in a clockwise direction as shown in Fig. 1 to result in plunger displacement. By proper determination of the tension of the spring 30, the weight of the rod 20 and the resistance of the plunger 25 of the dial indicator 10 to movement are almost entirely balanced and but a small force against the fingers 12, 13 is required to produce movement of the indicator pointer.

To permit convenient utilization of the described gauge within bores of various lengths, the hollow bar 11 and the rod 20 can comprise, as shown, a number of sections, which may be removed or added as the occasion arises. The hollow bar sections are arranged for threaded connection as shown at 31 and rod sections corresponding in length to the bar sections are inserted as required.

The device is arranged for operation in two different manners, as will be described with reference to Figs. 4 and 5, respectively. Either the work whose surface or surfaces are to be checked is mounted for rotation in which case the hollow bar 11 is merely supported in parallelism with the axis of the bore of the work, or the work is held immovable while the bar 11 itself is rotated, in which case, the bar must be positioned in actual coincidence with this axis. To establish and hold the bar 11 in the desired axial position, a tapered shank 32 can be provided integrally at the upper end thereof as shown in Fig. 1, and this tapered shank 32 can be inserted in a conventional tapered chuck 33, which itself is suitably arranged for lateral adjustment as well as for rotation.

If surfaces, such as those in the valve housing 35 shown in Figs. 4 and 5, are to be checked, by proper manipulation and adjustment of the chuck 33, one finger can be inserted into the valve housing bore and pressed against one surface thereof. Depending upon the disposition of this surface, one or the other of the described fingers 12, 13 is employed to provide for actuation of the indicator pointer and, furthermore, this finger is adjusted to a predetermined rotative position with respect to the mounting block 14 prior to the insertion. In choosing the finger to be employed, it is only necessary to remember that the finger must, when first pressed into engagement with the surface, cause the mounting block 14 to move in a clockwise direction about the fulcrum pin 15, as shown in Fig. 1 or Fig. 2, so as to produce displacement of the indicator pointer from its original zero position. The finger chosen is then adjusted pivotally on the mounting block within relatively wide limits so that only the ball at its extremity will be caused to engage the surface to be checked.

In Fig. 4, the operation of the gauge is illustrated upon the valve housing 35 when this housing is mounted for rotation about its own axis so that coincidence of the valve bore axis and the hollow bar is not required. To indicate any inaccuracies in the machining of a valve seat 35a whose general disposition is as shown in Fig. 4, the finger 12 positioned farthest from the mounting block fulcrum pin 15 is adjusted to an angle, as shown in full lines in Fig. 4, although it will be apparent here that the angular disposition of the finger 12 on the mounting block 14 is not critical, as previously mentioned. To perform the indicating operation upon the valve seat 35a, the bar 11 is inserted until the finger 12 is pressed against said seat sufficiently to shift the rod 20 and produce a sizeable movement of the pointer of the dial indicator 10. The valve housing 35 is then rotated about its own axis so that the end of the finger 12 in contact with the valve seat 35a traverses a circumferential line thereon. Any disfigurations or inaccuracies in the surface of the valve seat 35a will cause the pointer of the indicator 10 to shift in one direction or the other and thus indicate that said valve seat 35a needs further machining.

After completion of this indication, the other finger 13 which was preset to a determined angle, may be brought into engagement with the cylindrical bore portion 35b of the valve housing by a lateral shifting movement of the chuck 33 which supports the gauge, this position being indicated by phantom lines in Fig. 4. Again, the valve housing 35 is rotated and any inaccuracies or eccentricity in the surface of the cylindrical bore 35b will be indicated by a shift of the pointer of the dial indicator 10. Thus two surfaces within the valve housing 35 can be checked without the necessity for withdrawal of the gauge from the interior of the housing.

If it is assumed that the valve housing 35 or other piece of work, whose surface or surfaces are to be checked by the gauge of the present invention, is not mounted for rotation about its own axis, it is necessary that the bar 11 be inserted so as to be disposed with its axis coincident with the axis of the valve housing bore. This type of operation is illustrated in Fig. 5, wherein one finger 13 has been preset to enable checking the accuracy of the machine work done on a flange 35c formed at the end of the valve housing. After the insertion in the manner described, the chuck 33 which supports the surface gauge, is rotated so that the ball at the end of the finger 13 traverses the surface of the flange 35c so as to indicate any inaccuracies thereof on the dial indicator 10, as previously described.

In either method of operation, the indicator 10 remains outside the valve housing to provide an easily visible indication of any inaccuracies of the surface being checked.

Obviously many modifications and variations of the present invention are possible in the light of the above teachings. It is therefore to be understood that within the scope of the appended claims the invention may be practiced otherwise than as specifically described.

We claim:

1. Arrangement for indicating inaccuracies in machined surfaces of the described type comprising a thin elongated hollow bar, a visual indicator having a pointer mounted adjacent one end of said bar, a block mounted at the other end of said bar for pivotal movement about an axis at right angles to and offset from the axis of said bar, means including a rod slidably supported within said hollow bar for transmitting pivotal movement of said block to the pointer of said indicator, spring means arranged to urge said block against said rod, and a pair of fingers mounted for pivotal adjustment on said block at points on opposite sides of both the axis of said hollow bar and the pivotal axis of said block, whereby said fingers will upon contact with a surface cause movement of the pointer of said indicator.

2. Arrangement according to claim 1 comprising means for adjusting the movement of said pointer in response to a given pivotal movement of said block.

3. Arrangement for indicating inaccuracies in machined surfaces of the described type comprising a pivotally-mounted block, a pair of surface-contact members supported by said block on opposite sides of a plane passing through the pivotal axis thereof and perpendicular to the longitudinal dimension of said block, an indicator having a pointer operatively connected to said block so as to provide a visual indication of pivotal movement of said block, said pointer being arranged to resist motion in one direction, and spring means connected to said block to urge the same in a direction such that the resistance, occasioned by the linkage interposed between said pointer and said block, of the pointer to motion in said one direction initiated in response to force applied to said surface-contact members is substantially counterbalanced.

References Cited in the file of this patent

UNITED STATES PATENTS

| | | |
|---|---|---|
| 483,354 | Hinden | Sept. 27, 1892 |
| 843,043 | Sigrist | Feb. 5, 1907 |
| 1,186,911 | Kinney | June 13, 1916 |
| 1,241,469 | Payne | Sept. 25, 1917 |
| 1,299,838 | Keller | Apr. 8, 1919 |
| 1,606,475 | Kute | Nov. 9, 1926 |
| 1,673,480 | Ames | June 12, 1928 |
| 1,723,529 | Schwieterman | Aug. 6, 1929 |
| 1,867,387 | Smith | July 12, 1932 |
| 2,320,192 | Palmer | May 25, 1943 |

FOREIGN PATENTS

| | | |
|---|---|---|
| 622,319 | Great Britain | Apr. 29, 1949 |